United States Patent
Li et al.

(10) Patent No.: US 11,309,559 B2
(45) Date of Patent: Apr. 19, 2022

(54) MULTI-ENVIRONMENT INTEGRATIVE THERMAL MANAGEMENT METHOD FOR FUEL CELL VEHICLE

(71) Applicant: TSINGHUA UNIVERSITY, Beijing (CN)

(72) Inventors: Jian-Qiu Li, Beijing (CN); Hui-Ze Liu, Beijing (CN); Liang-Fei Xu, Beijing (CN); Zun-Yan Hu, Beijing (CN); Ming-Gao Ouyang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/494,841

(22) Filed: Oct. 6, 2021

(65) Prior Publication Data

US 2022/0029182 A1    Jan. 27, 2022

Related U.S. Application Data

(63) Continuation-in-part of application No. PCT/CN2020/086970, filed on Apr. 26, 2020.

(30) Foreign Application Priority Data

Mar. 20, 2020 (CN) .......................... 202010199241.9

(51) Int. Cl.
*H01M 8/0432* (2016.01)
*B60L 58/33* (2019.01)
*B60H 1/00* (2006.01)
*B60L 58/34* (2019.01)

(52) U.S. Cl.
CPC .... *H01M 8/04358* (2013.01); *B60H 1/00278* (2013.01); *B60L 58/33* (2019.02); *B60L 58/34* (2019.02); *H01M 2250/20* (2013.01)

(58) Field of Classification Search
CPC .......... H01M 8/04358; H01M 2250/20; B60L 58/33; B60L 58/34; B60H 1/00278
See application file for complete search history.

(56) References Cited

FOREIGN PATENT DOCUMENTS

| CN | 103326048 | 9/2013 |
|---|---|---|
| CN | 108172930 | 6/2018 |
| CN | 109244505 | 1/2019 |
| CN | 109962268 | 7/2019 |
| CN | 110649281 | 1/2020 |
| CN | 110676481 | 1/2020 |
| DE | 102017209703 | 6/2018 |
| EP | 0993060 | 4/2000 |
| JP | 2000195533 | 7/2000 |
| JP | 2008123697 | 5/2008 |

*Primary Examiner* — Sarah A. Slifka

(57) ABSTRACT

A multi-environment integrative thermal management method for a fuel cell vehicle is provided. The method can ensure the accuracy and the stability of the control for a temperature of a fuel cell system of the fuel cell vehicle in a complicated and changeable environment, decrease the energy consumption of the entire vehicle, and increase the economical efficiency of the entire vehicle.

17 Claims, 2 Drawing Sheets

MULTI-ENVIRONMENT INTEGRATIVE THERMAL MANAGEMENT METHOD FOR FUEL CELL VEHICLE

CROSS-REFERENCE TO RELATED APPLICATIONS

This application claims all benefits accruing under 35 U.S.C. § 119 from China Patent Application No. 202010199241.9, filed on Mar. 20, 2020 in the China National Intellectual Property Administration, the content of which is hereby incorporated by reference. This application is a continuation-in-part under 35 U.S.C. § 120 of international patent application PCT/CN2020/086970 filed on Apr. 26, 2020, the content of which is also hereby incorporated by reference.

FIELD

The present disclosure relates to the technical field of new energy vehicle, and particularly to a multi-environment integrative thermal management method for a fuel cell vehicle.

BACKGROUND

In recent years, new energy vehicles have been developed rapidly. Fuel cells have attracted wide attention owing to the advantages such as high efficiency, cleanness, and pollution-free and therefore have a broad development prospect in transportation. Especially, in terms of the commercial vehicle, a traveling range of a fuel cell vehicle is larger than that of a pure electric vehicle. However, as compared to the conventional internal combustion engine vehicles, the working temperature of the fuel cells is relatively low, so that it is more difficult for the fuel cell vehicles to dissipate heat through the temperature difference with the environment. Therefore, thermal management for the fuel cell vehicles is still a great challenge.

The environmental temperature greatly affects the performance of the fuel cells. However, when facing different working environments, conventional thermal management methods for the fuel cell vehicles only focus on fuel cell cooling and heat dissipation, while the excess heat generated by the fuel cells during operation is underused. Or, the excess heat generated by the fuel cells is only used to generally heat the vehicles, while the problems such as temperature retention for power batteries are not taken into account. Therefore, through the conventional thermal management methods for the fuel cell vehicles, the temperature control of the fuel cell systems is unstable and inaccurate, and the vehicles have relatively high energy consumptions and poor economical practicability.

SUMMARY

A multi-environment integrative thermal management method for a fuel cell vehicle, applied to a fuel cell thermal management sub-system of the fuel cell vehicle, is provided.

The fuel cell thermal management sub-system includes a fuel cell system, a first pump, a first valve, a first heater, a second valve, a first radiator, and a first tank, the fuel cell system has a cooling liquid inlet and a cooling liquid outlet. The cooling liquid inlet is in communication with an output end of the first heater, an input end of the first heater is in communication with a first end of the first valve, a second end of the first valve is in communication with an output end of the first pump, and an input end of the first pump is in communication with the cooling liquid outlet. The cooling liquid inlet is further in communication with an output end of the first radiator, an input end of the first radiator is in communication with a first end of the second valve, and a second end of the second valve is in communication with a third end of the first valve. The first heater, the first valve, the first pump, and the fuel cell system form a minor circulating system. The first radiator, the second valve, the first valve, the first pump, and the fuel cell system form a major circulating system.

The method includes:

detecting a current environment temperature T; and proceeding steps of a first control mode if the current environment temperature T is equal to or larger than an environment temperature threshold $T_1$; and proceeding steps of a second control mode if the current environment temperature T is lower than the environment temperature threshold $T_1$.

The steps of the first control mode includes:

acquiring a control variable selected from a pump rotational speed $n_{pump}$ of the first pump, an opening degree $\alpha$ of the first valve, a fan on-off state $u_{fan}$ of the first radiator, and any combination thereof;

performing a feedforward control of a fuel cell temperature of the fuel cell system by controlling the control variable;

obtaining a current fuel cell temperature $T_{fc}$ of the fuel cell system, and performing a feedback control of the fuel cell temperature according to a difference between the current fuel cell temperature $T_{fc}$ and a target fuel cell temperature $T_2$, to acquire a compensation amount; and making a compensation for the control variable in the feedforward control according to the compensation amount, thereby controlling the fuel cell temperature of the fuel cell system to reach the target fuel cell temperature $T_2$.

In the multi-environment integrative thermal management method for the fuel cell vehicle according to the present application, when the fuel cell vehicle is started, the environment temperature condition of the fuel cell vehicle can be acquired by detecting the current environment temperature T and comparing the current environment temperature T with the environment temperature threshold $T_1$, so as to allow the fuel cell vehicle to enter the corresponding control mode. The environment temperature threshold $T_1$ can be a threshold of an environment temperature for determining which control mode the fuel cell vehicle is to enter and whether additional heat is required to be supplied to the power battery and/or the cabin to keep the power battery and/or the cabin warm.

Any one or a combination of the pump rotational speed $n_{pump}$, the opening degree $\alpha$, and the fan on-off state $u_{fan}$ can be adopted as the control variable. The feedforward control can be based on one, two, or all of the three control variables. The working conditions of the first pump, the first valve, and the first radiator of the fuel cell thermal management sub-system can be acquired in real time. The multi-environment integrative thermal management method can be performed on the basis of controlling the first pump, the first valve, and the first radiator of the fuel battery heat management sub-system. The current fuel cell temperature $T_{fc}$ can be detected in real time and compared with the target fuel cell temperature $T_2$ to acquire the difference therebetween. Through the control algorithm in the feedback control on the basis of the temperature difference, the compensation amount can be obtained. The compensation can be made in the feedforward control for the control variable on the basis of the feedback control, to allow the temperature of the fuel cell system to reach the target fuel cell temperature $T_2$. Therefore, by using the multi-environment integrative thermal management method, the temperature of the fuel cell system can be maintained in a suitable range around the target fuel cell temperature $T_2$, ensuring the stability and the accuracy of the temperature control.

BRIEF DESCRIPTION OF THE DRAWINGS

To describe the technical solutions in the embodiments of the present disclosure more clearly, the following briefly describes the accompanying drawings referred in the description of the embodiments. The accompanying drawings in the following description show merely some embodiments of the present disclosure, and a person of ordinary skill in the art may derive other drawings from the provided accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In order to make the objects, technical solutions, and advantages of the present disclosure more clear, the present disclosure will be further described in detail below with reference to the accompanying drawings and embodiments. It is understood that the specific embodiments described herein are merely illustrative of the disclosure and are not intended to limit the present disclosure.

In the present disclosure, the term "cooling liquid" inherits the terminology that is used in the art of fuel cell, but not intended to limit that the liquid is only to perform a cooling step. The temperature of the cooling liquid can be regulated in the present disclosure, so that the cooling liquid can also heat an adjacent object whose temperature is lower than the cooling liquid.

Figure 1:
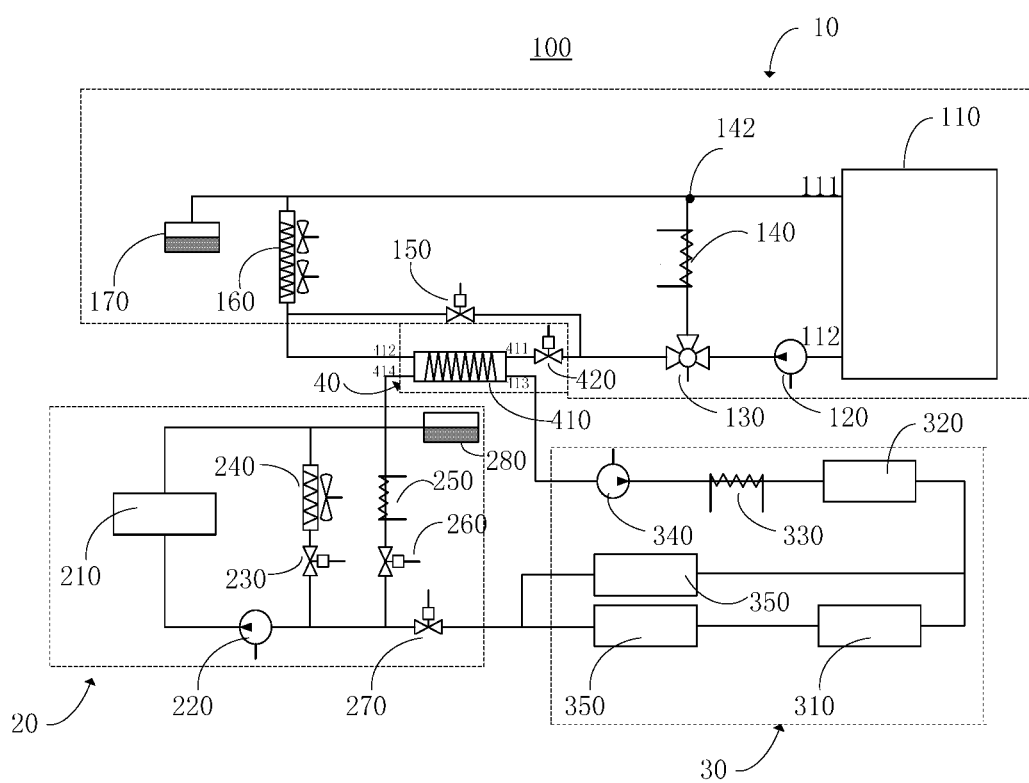
FIG. 1 is a schematic structural view of an integrative thermal management system of a fuel cell vehicle according to an embodiment of the present disclosure.

Referring to FIG. 1, the present disclosure provides a multi-environment integrative thermal management method. The multi-environment integrative thermal management method is applied to a fuel cell vehicle. The fuel cell vehicle includes an integrative thermal management system 100. The integrative thermal management system 100 includes a fuel cell thermal management sub-system 10, a power battery thermal management sub-system 20, a cabin air heating sub-system 30, and a heat exchanging sub-system 40. The fuel cell thermal management sub-system 10 includes a fuel cell system 110, a first pump 120, a first valve 130, a first heater 140, a second valve 150, a first radiator 160, and a first tank 170. The fuel cell system 110, including a stack of fuel cells, is configured to output power to drive the fuel cell vehicle. The fuel cell system 110 has a cooling liquid inlet 111 and a cooling liquid outlet 112. The cooling liquid inlet 111 is in fluid communication with an output end of the first heater 140. An input end of the first heater 140 is in fluid communication with a first end of the first valve 130. The cooling liquid can flow through the first heater 140 from the input end to the output end and can be heated in the first heater 140 by a heating element such as an electric resistance wire. A second end of the first valve 130 is in fluid communication with an output end of the first pump 120. An input end of the first pump 120 is in fluid communication with the cooling liquid outlet 112.

The cooling liquid inlet 111 is in fluid communication with an output end of the first radiator 160. An input end of the first radiator 160 is in fluid communication with a first end of the second valve 150. A second end of the second valve 150 is in fluid communication with a third end of the first valve 130. The first heater 140, the first valve 130, the first pump 120, and the fuel cell system 110 collectively form a minor circulating system for the cooling liquid circulation. The first radiator 160, the second valve 150, the first valve 130, the first pump 120, and the fuel cell system 110 collectively form a major circulating system for the cooling liquid circulation. The cooling liquid can flow through the first radiator 160 from the input end to the output end. The first radiator 160 can dissipate heat carried by the cooling liquid through a fan.

The power battery thermal management sub-system 20 includes a power battery 210 (e.g., a lithium ion battery), a second pump 220, a fourth valve 230, a second radiator 240, a second heater 250, a third valve 260, a fifth valve 270, and a second tank 280. The cabin air heating sub-system 30 includes a cabin warmer 310, a windscreen defroster 320, a third heater 330, a third pump 340, and a radiator module 350. The heat exchanging sub-system 40 includes a heat exchanger 410 and a sixth valve 420. The power battery 210 is configured to output additional power to drive the fuel cell vehicle.

A first end of the sixth valve 420 is in fluid communication with the third end of the first valve 130. A second end of the sixth valve 420 is in fluid communication with a first inlet 411 of the heat exchanger 410. A first outlet 412 of the heat exchanger 410 is in fluid communication with the input end of the first radiator 160. The cooling liquid of the fuel cell thermal management sub-system 10 can flow through the heat exchanger 410 from the first inlet 411 to the first outlet 412.

A second inlet 414 of the heat exchanger 410 is in fluid communication with an input end of the second heater 250. A cooling liquid outlet of the power battery 210 is in fluid communication with the input end of the second heater 250. An output end of the second heater 250 is in fluid communication with a first end of the third valve 260. The cooling liquid can flow through the second heater 250 from the input end to the output end and can be heated in the second heater 250 by a heating element such as an electric resistance wire. A second end of the third valve 260 is in fluid communication with an input end of the second pump 220. An output end of the second pump 220 is in fluid communication with a cooling liquid inlet of the power battery 210. An input end of the second radiator 240 is in fluid communication with the cooling liquid outlet of the power battery 210. An output end of the second radiator 240 is in fluid communication with a first end of the fourth valve 230. The cooling liquid can flow through the second radiator 240 from the input end to the output end. The second radiator 240 can dissipate heat carried by the cooling liquid through a fan. A second end of the fourth valve 230 is in fluid communication with the input end of the second pump 220. The second end of the third valve 260 is in fluid communication with a first end of the fifth valve 270.

A second outlet 413 of the heat exchanger 410 is in fluid communication with an input end of the third pump 340. The cooling liquid of the power battery thermal management sub-system 20 can flow through the heat exchanger 410 from the second inlet 414 to the second outlet 413. The cooling liquid of the power battery thermal management sub-system 20 and the cooling liquid of the fuel cell thermal management sub-system 10 can be fluid insulated from and convectively with each other in different passages to exchange heat with each other in the heat exchanger 410. An output end of the third pump 340 is in fluid communication with an input end of the third heater 330. An output end of the third heater 330 is in fluid communication with an input end of the windscreen defroster 320. The cooling liquid can flow through the third heater 330 from the input end to the output end and can be heated in the third heater 330 through a heating element such as an electric resistance wire. An output end of the defroster 320 is in fluid communication with an input end of the cabin warmer 310. An output end of the cabin warmer 310 is in fluid communication with an input end of the radiator module 350. An output end of the radiator module 350 is in fluid communication with a second end of the fifth valve 270. The cooling liquid can flow through the windscreen defroster 320, the cabin warmer 310, and the radiator module 350 from the input ends to the output ends, during which heat can be released form the cooling liquid. The fluid communication is realized through pipelines in the integrative thermal management system 100. The cooling liquid is driven by the first, second, and third pumps 120, 220, 340 to flow in the pipelines along the directions from input ends to output ends in the integrative thermal management system 100. The circulation of the cooling liquid in specific pipelines or sub-systems are controlled by regulating open or close of the first, second, third, fourth, and fifth valves 130, 150, 260, 230, 270.

The multi-environment integrative thermal management method for the fuel cell vehicle includes:

detecting a current environment temperature T;

proceeding steps of a first control mode if the current environment temperature T is equal to or higher than an environment temperature threshold $T_1$; and proceeding steps of a second control mode if the current environment temperature T is lower than the environment temperature threshold $T_1$.

When the fuel cell vehicle is started, the environment temperature condition of the fuel cell vehicle can be acquired by detecting the current environment temperature T and comparing the current environment temperature T with the environment temperature threshold $T_1$, so as to allow the fuel cell vehicle to enter the corresponding control mode. The environment temperature threshold $T_1$ can be a threshold of an environment temperature for determining which control mode the fuel cell vehicle is to enter and whether additional heat is required to be supplied to the power battery 210 and/or the cabin to keep the power battery 210 and/or the cabin warm.

Figure 2:
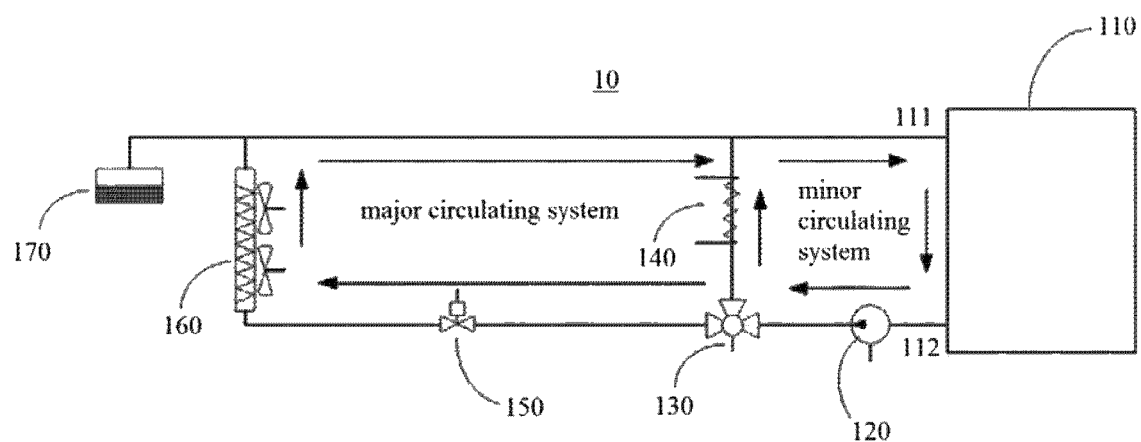
FIG. 2 is a schematic structural view showing a major circulating system and a minor circulating system of a fuel cell thermal management sub-system of the integrative thermal management system according to an embodiment of the present disclosure.

When the current environment temperature T is equal to or higher than the environment temperature threshold $T_1$, meaning that the fuel cell vehicle is in a normal-temperature environment, the fuel cell vehicle enters the first control mode, in which there is no need for the cabin and/or the power battery system to acquire additional heat, e.g., from the fuel cell system 110. Thus, in the first control mode, the heat exchanging sub-system 40 is shut down, i.e., the six valve 420 is closed. The cooling liquid of the fuel cell thermal management sub-system 10 completely by-passes the heat exchanging sub-system 40. The fuel cell thermal management sub-system 10 and the power battery thermal management sub-system 20 work independently from each other. The simplified structure of the fuel cell thermal management sub-system 10 is shown in FIG. 2.

When the current environment temperature T is lower than the environment temperature threshold $T_1$, meaning that the fuel cell vehicle is in a low temperature environment, the fuel cell vehicle enters the second control mode, in which there may be a need for the cabin and/or the power battery system to acquire heat from the fuel cell system 110. In the second control mode, the heat exchanging sub-system 40 can be opened up, i.e., the six valve 420 can be opened, so that heat exchange can exist between the fuel cell thermal management sub-system 10 and the power battery thermal management sub-system 20.

Figure 3:
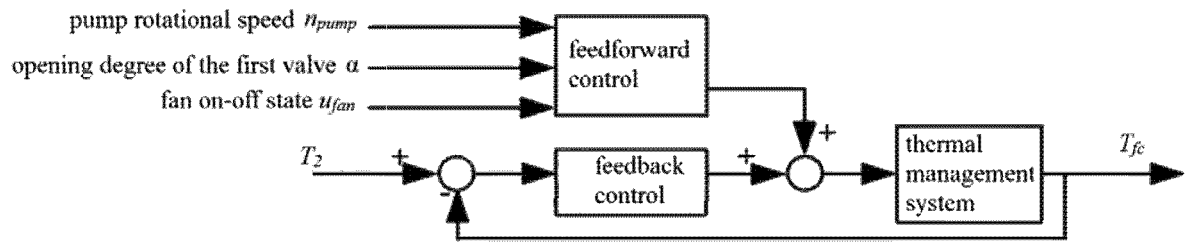
FIG. 3 is a schematic view of a first control mode of the multi-environment integrative thermal management method according to an embodiment of the present disclosure.

Referring to FIG. 3, the steps of the first control mode include:

acquiring a control variable selected from a pump rotational speed $n_{pump}$ of the first pump 120, an opening degree α of the first valve 130, a fan on-off state $u_{fan}$ of the first radiator 160, and any combination thereof;

performing a feedforward control of a fuel cell temperature of the fuel cell system 110 by controlling the control variable;

obtaining a current fuel cell temperature $T_{fc}$ of the fuel cell system 110, and performing a feedback control of the fuel cell temperature according to a difference between the current fuel cell temperature $T_{fc}$ and a target fuel cell temperature $T_2$, to acquire a compensation amount; and making a compensation for the control variable in the feedforward control according to the compensation amount, thereby controlling the fuel cell temperature of the fuel cell system 110 to reach the target fuel cell temperature $T_2$.

In this embodiment, any one or a combination of the pump rotational speed $n_{pump}$, the opening degree α, and the fan on-off state $u_{fan}$ can be adopted as the control variable. The feedforward control can be based on one, two, or all of the three control variables. The pump rotational speed $n_{pump}$ of the first pump 120 refers to a rotational speed of a rotator, e.g., a rotating shaft, of the first pump 120. The opening degree α of the first valve 130 refers to a ratio of a flow rate of the cooling liquid output to the first heater 140 to a flow rate of the cooling liquid input to the first valve 130 from the first pump 120. The opening degree α can be in a range from 0 to 1. When the opening degree α is 0, all of the cooling liquid is circulated in the major circulating system. When the opening degree α is 1, all of the cooling liquid is circulated in the minor circulating system. When the opening degree α is larger than 0 and smaller than 1, a portion of the cooling liquid is circulated in the major circulating system, while the other portion of the cooling liquid is circulated in the minor circulating system. The fan on-off state $u_{fan}$ of the first radiator 160 denotes the on-off state of the fan of the first radiator 160 and only equals to 1 or 0. 1 denotes that the fan is on. 0 denotes that the fan is off.

The working conditions of the first pump 120, the first valve 130, and the first radiators 160 of the fuel cell thermal management sub-system 10 can be acquired in real time by, for example, respective sensors provided in the fuel battery heat management sub-system 10. The multi-environment integrative thermal management method can be performed on the basis of controlling the first pump 120, the first valve 130, and the first radiator 160 of the fuel battery heat management sub-system 10. The other factors in the fuel battery heat management sub-system 10 that could affect the fuel cell temperature of the fuel cell system 110 can be fixed to have constant values.

Under the initial feedforward control by controlling the control variable, the fuel cell temperature of the fuel cell system 110 can be regulated to be approximate to the target fuel cell temperature $T_2$. The current fuel cell temperature $T_{fc}$, i.e., an actual value, can be detected in real time. The current fuel cell temperature $T_{fc}$ can be compared with the target fuel cell temperature $T_2$ to acquire the difference therebetween. Through the control algorithm in the feedback control on the basis of the temperature difference, the compensation amount can be obtained. The compensation amount can be directly a compensating value of the control variable or can be a temperature value, from which a compensating value of the control variable can be obtained. That is, the compensation can be made in the feedforward control for the control variable on the basis of the feedback control, to allow the temperature of the fuel cell system 110 to reach the target fuel cell temperature $T_2$. Therefore, by using the multi-environment integrative thermal management method, the temperature of the fuel cell system 110 can be maintained in a suitable range around the target fuel cell temperature $T_2$, ensuring the stability and the accuracy of the temperature control.

In an embodiment, the steps in the first control mode further include acquiring value of a relevant parameter, such as a power of the first heater 140 and/or a rotation speed of the fan of the first radiator 160, for achieving the feedforward control. The power of the first heater 140 and/or the rotation speed of the fan of the first radiator 160 can also be selected as the control variable.

In an embodiment, the performing the feedforward control of the fuel cell temperature includes:

regulating a temperature $T_{w,m}$ of the cooling liquid at the cooling liquid inlet 111 of the fuel cell system 110 to reach the target fuel cell temperature $T_2$ by controlling the control variable according to following equations (1) to (6):

$$T_{w,m}=[\alpha W_w \cdot T_{w,s}+(1-\alpha) W_w \cdot T_{w,rad,out}]/W_w \quad (1)$$

$$\dot{T}_{w,s}=C_w \cdot \alpha W_w \cdot (T_{w,out}-T_{w,s})/C_1+P_a/C_1 \quad (2)$$

$$\dot{T}_{w,rad,out}=(1-\alpha) W_w \cdot [T_{w,rad,in}(t-h_{rad})-\Delta T-T_{w,rad,out}]/m_{rad} \quad (3)$$

$$\Delta T=\int_{t-h_{rad}}^{t}[u_{fan} \cdot k_{rad} \cdot (T_{w,rad,in}-T_{atm})/((1-\alpha) W_w \cdot C_w)]d\tau \quad (4)$$

$$W_w=Q_V \cdot \rho \quad (5)$$

$$Q_V=D \cdot n_{pump} \quad (6)$$

In the equation (1), $T_{w,s}$ denotes a temperature of the cooling liquid in the minor circulating system, which has just been flown out from the first heater 140 but has not been mixed with the cooling liquid flowing from the first radiator 160, i.e., $T_{w,s}$ denotes the cooling liquid temperature at the output end of the first heater 140. $T_{w,rad,out}$ denotes a temperature of the cooling liquid at the output end of the first radiator 160.

$W_w$ denotes a mass flow rate of the cooling liquid flowing through the first pump 120 and input to the first valve 130. Flow rates of the cooling liquid in the major and minor circulating systems depend on the opening degree $\alpha$ of the first valve 130 (e.g., a three-way valve or a thermostat). The flow rate of the cooling liquid in the minor circulating system is equal to $\alpha W_w$. The flow rate of the cooling liquid in the major circulating system is equal to $(1-\alpha)W_w$.

Since the actual fuel cell temperature is directly related to the temperature $T_{w,m}$ of the cooling liquid at the cooling liquid inlet 111 of the fuel cell system 110, the fuel cell temperature can be regulated by regulating the temperature $T_{w,m}$. The cooling liquid in the minor circulating system and the cooling liquid in the major circulating system are mixed at a mixing point 142 before they flow into the fuel cell system 110. $T_{w,m}$ is substantially equal to the temperature of the mixed cooling liquid at the mixing point 142. $T_{w,rad,out}$ is substantially equal to the temperature of the cooling liquid in the major circulating system at the mixing point 142. $T_{w,s}$ is substantially equal to the temperature of the cooling liquid in the minor circulating system at the mixing point 142. Thus, $T_{w,m}$ can be regulated according to the equation (1).

The temperature $T_{w,s}$ of the cooling liquid in the minor circulating system at the mixing point 142 can be regulated according to the equation (2). In the equation (2), $C_w$ denotes a specific heat capacity of the cooling liquid. $P_a$ denotes a heating power of the first heater 140. $C_1$ denotes a total of heat capacities of the components of the minor circulating system through which the cooling liquid flows from the cooling liquid outlet 112 of the fuel cell system to the mixing point 142, and in the present embodiment is a total of heat capacities of the first pump 120 and the first heater 140. $T_{w,out}$ denotes a temperature of the cooling liquid at the cooling liquid outlet 112 of the fuel cell system 110.

The temperature $T_{w,rad,out}$ of the cooling liquid at the output end of the first radiator 160, which is substantially equal to the temperature of the cooling liquid in the major circulating system at the mixing point 142, can be regulated according to the equations (3) and (4). The first radiator 160 has a certain volume, requiring a relatively long time period for the cooling liquid to flow therethrough. The time period, also known as the time delay, is constant and depends on the flow rate of the cooling liquid and the volume of the first radiator 160. Since the specific heat capacity of the first radiator 160 is relatively large, the temperature of the cooling liquid output from the first radiator 160 is affected by the heat capacity of the first radiator 160, i.e., the first radiator 160 has a temperature filtering effect on the cooling liquid, which is represented by the equation (3).

In the equations (3) and (4), $T_{w,rad,in}$ denotes a temperature of the cooling liquid at the input end of the first radiator 160. $\Delta T$ denotes a temperature decrease caused by the fan of the first radiator 160. $m_{rad}$ denotes a mass of the cooling liquid in the first radiator 160. $k_{rad}$ denotes a coefficient of the heat dissipation of the first radiator 160. $T_{atm}$ denotes an environment temperature. $h_{rad}$ denotes the time period required to allow the cooling liquid to flow through the first radiator 160. The equation (3) calculates the temperature decrease, in a total time from $t-h_{rad}$ to t the cooling liquid takes to pass through the first radiator 160 and cooled by the fan. As mentioned above, $u_{fan}$ denotes the on-off state of the fan of the first radiator 160, and only equals to 1 or 0. 1 denotes that the fan is on. 0 denotes that the fan is off.

The mass flow rate $W_w$ of the cooling liquid can be calculated according to the equations (5) and (6). In the equations (5) and (6), $Q_v$ denotes a volume flow rate of the cooling liquid input to the first valve 130 from the first pump 120. $\rho$ denotes a density of the cooling liquid. D denotes a displacement of the first pump 120.

In the equations (1) to (6), $C_w$ and $\rho$ are inherent attributes of the cooling liquid, and thus have fixed values. $P_a$, $C_1$, $h_{rad}$, $m_{rad}$, and $k_{rad}$ are design parameters of the first heater 140, the first radiator 160, and the first pump 120, and can be acquired from the manufacture's manual. These parameters can be set to fixed values. $T_{w,rad,in}$, $T_{atm}$, and $T_{w,out}$ can be acquired in real time from corresponding sensors.

The mass flow rate $W_w$ of the cooling liquid can be regulated by controlling the pump rotational speed $n_{pump}$ of the first pump 12. The temperature $T_{w,rad,out}$ of the cooling liquid at the output end of the first radiator 160 can be regulated by controlling the on-off state $u_{fan}$ of the fan of the first radiator 160 and the mass flow rate $W_w$. The temperature $T_{w,m}$ of the cooling liquid at the cooling liquid inlet 111 of the fuel cell system 110 can be regulated by controlling the opening degree α of the first valve 130, the mass flow rate $W_w$, and the temperature $T_{w,rad,out}$ of the cooling liquid at the output end of the first radiator 160. Thus, $T_{w,m}$ can be regulated by controlling the control variable selected from the pump rotational speed $n_{pump}$, the opening degree α, the fan on-off state $u_{fan}$, and any combination thereof. It should be noted that if any one of the pump rotational speed $n_{pump}$, the opening degree α, and the fan on-off state $u_{fan}$ is not selected as the control variable, this factor is set to a fixed value in the feedforward control.

In an embodiment, since the temperature $T_{w,m}$ of the cooling liquid at the cooling liquid inlet 111 is approximate to the actual fuel cell temperature, $T_{w,m}$ can be regulated to reach the target fuel cell temperature $T_2$ by controlling the control variable according to the equations (1) to (6), so that the fuel cell temperature can be approximate to the target fuel cell temperature $T_2$.

In an embodiment, in the step of obtaining the current fuel cell temperature $T_{fc}$ of the fuel cell system 110, assuming that temperatures and pressures of the cooling liquid at the cooling liquid inlet 111 and the cooling liquid outlet 112 are known, the enthalpy values of the cooling liquid flowing into and out from the fuel cell can be acquired. The volume flow rate of the cooling liquid can be acquired from equation (6). A thermal model of the fuel cell system 110 includes:

$$\frac{dp}{dt} = \frac{\beta_T \cdot \sum dm_i}{\rho V} + \beta_T \delta \frac{dT}{dt} \quad (7)$$

$$\frac{dT}{dt} = \frac{P_{heat,fc} + \sum dmh_i - h \sum dm}{\rho c_p V} + \frac{\delta T}{\rho c_p} \frac{dp}{dt}. \quad (8)$$

$\beta_T$ denotes an isothermal bulk modulus, which satisfies $$\beta_T = \rho \cdot \left(\frac{\partial \rho}{\partial p}\right)_T^{-1}.$$

δ denotes an isobaric thermal expansion coefficient, which satisfies $$\delta = -\frac{1}{\rho} \cdot \left(\frac{\partial \rho}{\partial T}\right)_p.$$

The isothermal bulk modulus and the isobaric thermal expansion coefficient are the physical properties of the cooling liquid ρ, p, h respectively denote the density, the pressure, and the enthalpy of the cooling liquid in a cooling liquid channel of the fuel cell in the fuel cell system 110. T denotes the temperature of the cooling liquid in the cooling liquid channel, i.e., the temperature of the fuel cell system 110. V denotes a volume of the cooling liquid channel $c_p$ denotes a heat capacity of the cooling liquid $P_{heat,fc}$ denotes a quantity of heat generated by the fuel cell, which is calculated according to equation (9). $\Sigma dm_i$ denotes a sum of the mass flow rate at the cooling liquid inlet 111 and the mass flow rate at the cooling liquid outlet 112. $\Sigma dmh_i$ denotes a sum of the enthalpy at the cooling liquid inlet 111 and the enthalpy at the cooling liquid outlet 112.

$$P_{heat,fc} = (N_{cell} \cdot E_{nernst} - V_{stack}) \cdot I_{stack} \quad (9)$$

wherein $N_{cell}$ denotes a number of single fuel cells of the fuel cell system 110, $E_{nernst}$ denotes a Nernst voltage, $V_{stack}$ denotes a voltage of the fuel cell system 110, and $I_{stack}$ denotes an electric current of the fuel cell system 110.

The temperature T in the cooling liquid channel, i.e., the current fuel cell temperature $T_{fc}$ can be acquired by solving the equations (7) and (8).

In another embodiment, in the step of obtaining the current fuel cell temperature $T_{fc}$ of the fuel cell system 110, the current fuel cell temperature $T_{fc}$ can be obtained via temperature sensors disposed at the cooling liquid inlet 111 and the cooling liquid outlet 112. The temperatures of the cooling liquid at the cooling liquid inlet 111 and the cooling liquid outlet 112 are acquired via the temperature sensors. An average of the temperatures of the cooling liquid at the cooling liquid inlet 111 and the cooling liquid outlet 112 is calculated and used as the actual temperature in the fuel cell of the fuel cell system 110, i.e., the current fuel cell temperature $T_{fc}$.

In an embodiment, the compensation amount acquired by the feedback control is the compensation amount of the temperature of the cooling liquid at the mixing point 142 for compensating $T_{w,m}$. The performing the feedback control of the fuel cell temperature includes:

performing the feedback control to acquire a compensation amount for the temperature $T_{w,m}$ according to the difference between the current fuel cell temperature $T_{fc}$ and the target fuel cell temperature $T_2$;

calculating a compensation amount for the control variable on the basis of the compensation amount for the temperature $T_{w,m}$ according to, e.g., the equations (1) to (6).

In another embodiment, the compensation amount acquired by the feedback control is the compensation amount of the control variable, and the performing the feedback control of the fuel cell temperature includes:

performing the feedback control according to the difference between the current fuel cell temperature $T_{fc}$ and the target fuel cell temperature $T_2$ to calculate the compensation amount for the control variable.

The fuel cell temperature can be accurately regulated via the feedback control according to the difference between the current fuel cell temperature $T_{fc}$ and the target fuel cell temperature $T_2$. The control algorithm of the feedback control can be the PID control algorithm, the robust predictive control algorithm, the $H_\infty$ algorithm, or the like.

In an embodiment, the making the compensation for the control variable in the feedforward control according to the compensation amount is to add the compensation amount to the current value of the control variable. For example, if the pump rotational speed $n_{pump}$ of the first pump 120 is the only control variable, the feedback control algorithm is represented by $\Delta n_{pump} \, f(T_{fc}-T_2)$, and a compensation amount $\Delta n_{pump}$ for the pump rotational speed is calculated according to the difference between the current fuel cell temperature $T_{fc}$ and the target fuel cell temperature $T_2$. Then the pump rotational speed should be regulated to satisfy $n_{pump}' = n_{pump} + \Delta n_{pump}$, wherein the $n_{pump}'$ denotes the compensated pump rotational speed. It means that the pump rotational speed needs to be increased if the current fuel cell temperature $T_{fc}$ is larger than the target fuel cell temperature $T_2$, and the pump rotational speed needs to be decreased if the current fuel cell temperature $T_{fc}$ is smaller than the target fuel cell temperature $T_2$.

Under the first control mode, the fuel cell vehicle is in the normal-temperature environment, and the power battery 210 and the cabin have no heating or warming requirement, so that the heat dissipations of the fuel cell system 110 and the power battery system 210 are performed independently as conventional manners. The heat exchanging sub-system 40 is shut down, and the stability and the accuracy of the temperature control of the fuel cell system 110 is ensured by the above-described method including the feedforward control and the feedback control.

In an embodiment, the feedforward control is performed according to the pump rotational speed $n_{pump}$ and/or the opening degree $\alpha$ and/or the fan on-off state $u_{fan}$ in combination with a previously calibrated component MAP image which replaces the model to make the temperature of the fuel cell system 110 to reach the target fuel cell temperature $T_2$.

In an embodiment, the steps in the first control mode further include:

controlling the opening degree $\alpha$ of the first valve 130 to be 1 when the current fuel cell temperature $T_{fc}$ is lower than the target fuel cell temperature $T_2$, e.g., when the vehicle is in the starting stage; and controlling the opening degree $\alpha$ of the first valve 130 to be smaller than 1, when the current fuel cell temperature $T_{fc}$ is higher than or equal to the target fuel cell temperature $T_2$.

The target fuel cell temperature $T_2$ is a target working temperature of the fuel cell, which is generally 65° C. to 85° C. In the starting stage of the fuel cell vehicle, the current fuel cell temperature $T_{fc}$ is initially lower than the target fuel cell temperature $T_2$, and the fuel cell needs to be rapidly heated to the target working temperature. The first valve 130, which can be a three-way valve or a thermostat, can be regulated to allow all of the cooling liquid of the fuel cell thermal management sub-system 10 to flow in the minor circulating system and heated by the first heater 140, so as to utilize the heat generated in operation of the fuel cell and the heat generated by the first heater 140 to rapidly increase the temperature of the fuel cell system 110.

Once the current fuel cell temperature $T_{fc}$ reaches the target working temperature, i.e., $T_2$, which means that overheating of the fuel cell needs to be avoided, the opening degree $\alpha$ of the first valve 130 can be regulated to be smaller than 1 to allow at least a portion of the cooling liquid to flow through the major circulating system, so that the excess heat can be dissipated through the first radiator 160. When the fuel cell vehicle is in a stable driving stage, the feedforward control and the feedback control can be performed to accurately control the fuel cell temperature as described above.

In an embodiment, when the current environment temperature T is relatively high, for example, higher than a second environment temperature threshold $T_3$ (for example, 30° C.), the energy consumption for the heat dissipation is increased due to the small temperature difference between the environment and the fuel cell system 110, and a vehicle-mounted air conditioning system is usually started to perform the refrigeration. The vehicle-mounted air conditioning system is an air conditioning system mounted on the fuel cell vehicle.

In an embodiment, when the current fuel cell temperature $T_{fc}$ is higher than or equal to the target fuel cell temperature $T_2$, and especially when the current environment temperature T is relatively high, the steps in the first control mode can further include: decreasing an operating electric current and increasing an operating voltage of the fuel cell system 110.

The fuel cell vehicle can further include a vehicle power controlling system. The fuel cell operating current and the fuel cell operating voltage can be controlled by the vehicle power controlling system. The vehicle power controlling system is configured to control electric parameters, e.g., the operating currents, operating voltages, and output powers, of the power battery 210 and the fuel cell system 110. In this embodiment, the vehicle power controlling system and the integrative thermal management system 100 are synergistically controlled to increase the working efficiency of the fuel cell system 110, thereby decreasing the energy consumption of the entire vehicle and increasing the economical efficiency.

A heat generation power of the fuel cell can be calculated according to equation (9):

$$P_{heat,fc}(N_{cell} \cdot E_{nernst} - V_{stack}) \cdot I_{stack} \qquad (9)$$

wherein $P_{heat,fc}$ denotes the heat generation power of the fuel cell system 110, $N_{cell}$ denotes the number of single cells in the fuel cell system 110, $E_{nernst}$ denotes a Nernst voltage, $V_{stack}$ denotes a voltage of the fuel cell system 110, and $I_{stack}$ denotes an electric current of the fuel cell system 110.

It can be seen from the equation (9) that when the operating current is decreased and the operating voltage is increased, the quantity of heat generated by the fuel cell can be reduced, and the efficiency of the fuel cell can be increased; that is, the chemical energy in reactants in the fuel cell can be converted more into electric energy rather than into thermal energy. The output electric power of the fuel cell will be decreased with the decrease of the operating current and the increase of the operating voltage. Consequently, more electric power required in driving the vehicle needs to be supplied by the power battery system 210. The decrease in the quantity of heat generated by the fuel cell system 110 can decrease the electric energy consumption of heat dissipation of the fuel cell thermal management sub-system 10 and decrease the electric energy consumption of the vehicle-mounted air conditioning system, thereby decreasing the energy consumption of the entire vehicle and increasing the traveling range of the vehicle.

In an embodiment, the steps in the second control mode include:

controlling the opening degree $\alpha$ of the first valve 130 to be 1, and controlling the first heater 140, the second heater 250, and the third heater 330 to heat the cooling liquid when the quantity of heat generated by the fuel cell system 110 is smaller than or equal to a quantity of heat dissipated to the environment from the fuel cell system 110, e.g., when the vehicle is in the starting stage;

controlling the opening degree $\alpha$ of the first valve 130 to be smaller than 1 when the quantity of heat generated by the fuel cell system 110 is larger than the quantity of heat dissipated to the environment from the fuel cell system 110 and the temperature of the cooling liquid in the minor circulating system (or the current fuel cell temperature $T_{fc}$) is equal to or higher than the target fuel cell temperature $T_2$; and opening the six valve 420 when the temperature of the cooling liquid in the major circulating system is equal to or higher than the target fuel cell temperature $T_2$.

In this embodiment, a low temperature environment mode (i.e. the second control mode) is adopted when the current environment temperature T is lower than the environment temperature threshold $T_1$. The starting process of the fuel cell vehicle can be divided into several phases. When the environment temperature is too low, and the quantity of heat generated by the fuel cell system 110 is smaller than or equal to the quantity of heat dissipated to the environment from the fuel cell system 110, the fuel cell cannot be activated by the heat generated only by itself. In this case, all of the cooling liquid flows through the minor circulating system and is heated by the first heater 140. Moreover, the fourth valve 230 can be closed, and the power battery thermal management sub-system 20 also utilize the second heater 250 in a minor circulating system of the power battery thermal management sub-system 20 to rapidly heat the power battery 210 and keep the power battery 210 warm. Heat for the cabin can be supplied by the third heater 330.

When the temperature of the fuel cell system 110 is increased to the level allowing the fuel cell system 110 to be activated by the heat generated by itself, i.e., when the quantity of heat generated by the fuel cell system 110 is larger than the quantity of heat dissipated to the external environment from the fuel cell system 110, the heat starts to accumulate in the fuel cell system 110. When the temperature of the cooling liquid in the minor circulating system or the current fuel cell temperature $T_{fc}$ is equal to or higher than the target fuel cell temperature $T_2$, the major circulating system starts to work, and the temperature of the cooling liquid in the major circulating system is gradually increased.

When the temperature of the cooling liquid in the major circulating system is equal to or higher than the target fuel cell temperature $T_2$, the six valve 420 disposed at the heat exchanger 410 is opened. The cooling liquid in the fuel cell thermal management sub-system 10 flows through the heat exchanger 410 and exchanges heat with the cabin air heating sub-system 30, so that the temperature in the cabin is gradually increased. The cooling liquid flown through the windscreen defroster 320 and the radiator module 350 is then flown to the power battery system 210 to keep the power battery system 210 warm.

In an embodiment, the steps in the second control mode further includes:

acquiring a quantity $Q_{T,tgt}$ of heat required to be supplied into the cabin to keep the cabin at a target cabin temperature $T_{cabin}$ according to a heat balance model, represented by equation (12):

$$Q_{T,tgt} = c_p \rho_g V_{cabin} \frac{dT_{cabin}}{dt} \qquad (12)$$

wherein $c_p$ denotes a specific heat capacity of the air in the cabin, $\rho_g$ denotes a density of the air in the cabin, and $V_{cabin}$ denotes a volume of the cabin;

acquiring a volume flow rate $Q_{h,fc}$ of the cooling liquid in the major circulating system of the fuel cell thermal management sub-system 10 flowing through the heat exchanger 410 when all of the quantity $Q_{T,tgt}$ of heat is supplied by the heat exchanger 410, according to equation (13):

$$Q_{T,tgt} = \rho c_c Q_{h,fc} \cdot (T_{w,out} - T_{h,fc,out}) \qquad (13)$$

wherein $\rho$ denotes a density of the cooling liquid, $C_w$ denotes a specific heat capacity of the cooling liquid, $T_{w,out}$ denotes a temperature of the cooling liquid at the cooling liquid outlet 112, $T_{h,fc,out}$ denotes a temperature of the cooling liquid at the second outlet 413 of the heat exchanger 410;

regulating an opening degree $\alpha_1$ of the sixth valve 420 and an opening degree $\alpha_2$ of the second valve 150 to allow the cooling liquid of the major circulating system of the fuel cell thermal management sub-system 10 to flow through the heat exchanger 410 at the volume flow rate $Q_{h,fc}$, according to equation (14):

$$Q_{h,fc} = \frac{Q_1}{1 + f(\alpha_1, \alpha_2)} \qquad (14)$$

wherein $f(\alpha_1, \alpha_2)$ denotes a function of $\alpha_1$ and $\alpha_2$, and $Q_1$ denotes a total volume flow rate of the cooling liquid in the major circulating system of the fuel cell thermal management sub-system 10;

maintaining the fuel cell temperature of the fuel cell system 110 at the target fuel cell temperature $T_2$ by controlling the control variable selected from a group consisting of the pump rotational speed $n_{pump}$, the opening degree $\alpha$, the fan on-off state $u_{fan}$, and any combination thereof; and maintaining a cabin temperature of the cabin at the target cabin temperature $T_{cabin}$ by controlling a power of the third heater 330.

In this embodiment, when the fuel cell vehicle is in a stable driving state at the low temperature environment mode, the fuel cell thermal management sub-system 10 and the cabin air heating sub-system 30 are coupled together, and the fuel cell thermal management sub-system 10 exchanges heat with the cabin air heating sub-system 30 through the heat exchanger 410. The excess heat generated by the fuel cell system 110 is utilized to keep the cabin and the power battery 210 warm, thereby decreasing the energy consumption of the entire vehicle.

The equation (12) is derived from the following equation:

$$c_p \rho_g V_{cabin} \frac{dT_{cabin}}{dt} = Q_T + Q_B + Q_W + Q_E + Q_v + Q_p$$

wherein $Q_T$ denotes a quantity of heat required to be supplied into the cabin, $Q_B$ denotes a quantity of heat transferred into the cabin through the vehicle body, $Q_W$ denotes a quantity of heat transferred into the cabin through vehicle glass windows, $Q_E$ denotes a quantity of heat transferred into the cabin through the vehicle power controlling system, $Q_V$ denotes a quantity of heat permeated into the cabin due to the ventilation and the poor air tightness, and $Q_p$ denotes a quantity of heat dissipated from persons in the cabin. $Q_B$, $Q_W$, $Q_E$, $Q_V$, and $Q_p$ are regarded as zero in the present application.

Firstly, the quantity $Q_{T,tgt}$ of heat to be exchanged by the heat exchanger 410 is estimated according to equation (12), and the volume flow rate $Q_{h,fc}$ of the cooling liquid in the major circulating system flowing through the heat exchanger 410 when the quantity $Q_{T,tgt}$ of heat is supplied by the heat exchanger 410 is calculated according to equation (13). Then, the opening degree $\alpha_1$ of the sixth valve 420 and the opening degree $\alpha_2$ of the second valve 150 are regulated to regulate the volume flow rate $Q_{h,fc}$ of the cooling liquid of the major circulating system flowing through the heat exchanger 410. Thereafter, the fuel cell temperature and the cabin temperature are separately and simultaneously controlled.

In this embodiment, the volume flow rate $Q_{h,fc}$ of the cooling liquid in the major circulating system flowing through the heat exchanger 410 can be controlled by regulating the opening degrees $\alpha_1$ and $\alpha_2$ of the sixth valve 420 and the second valve 150 through a sliding mode control algorithm. The sum of the flow rates of the cooling liquid in the pipeline with the second valve 150 and the pipeline with the sixth valve 420 is equal to the total flow rate $Q_1$ of the cooling liquid in the major circulating system. With $Q_1$ known, $Q_{h,fc}$ can be controlled according to the equation (14).

In the equation (14), $f(\alpha_1,\alpha_2)$ denotes a function of $\alpha_1$ and $\alpha_2$, which is related to sizes of the valves and pipelines.

In an embodiment, $$f(\alpha_1, \alpha_2) = \sqrt{\frac{\xi\left(\frac{1}{\alpha_2 A_3}\right)^2 + \frac{L_4\lambda}{D_4}\left(\frac{1}{A_4}\right)^2 + \frac{L_5\lambda}{D_5}\left(\frac{1}{A_5}\right)^2}{\xi\left(\frac{1}{\alpha_1 A_1}\right)^2 + \frac{L_2\lambda}{D_2}\left(\frac{1}{A_2}\right)^2}},$$

wherein A1 and A3 are respectively flow areas of the second valve 150 and the sixth valve 420. A2 is a cross-sectional area of a pipe between the outlet of the second valve 150 and the inlet of the first radiator 160. D2 is a diameter of the pipe between the outlet of the second valve 150 and the inlet of the first radiator 160. L2 is a length of the pipe between the outlet of the second valve 150 and the inlet of the first radiator 160. A4, D4, and L4 are respectively a cross-sectional area, a diameter, and a length of a pipe between the outlet of the sixth valve 420 and the first inlet 411 of the heat exchanger 410. A5, D5, and L5 are respectively a cross-sectional area, a diameter, and a length of a pipe between the first outlet 412 of the heat exchanger 410 and the inlet of the first radiator 160. $\lambda$ is a resistance coefficient along the pipe. $\xi$ is a coefficient of local resistance of the valve.

In an embodiment, considering that a flow resistance in the heat exchanger 410 is much larger than a flow resistance in the cooling liquid pipelines, the sixth valve 420 is opened completely (i.e., the opening degree $\alpha_1$ of the sixth valve 420 is 1) when the fuel cell thermal management sub-system 10 supplies heat to the cabin air heating sub-system 30, and the volume flow rate $Q_{h,fc}$ of the cooling liquid in the heat exchanger 410 is controlled by regulating the opening degree $\alpha_2$ of the second valve 150.

In an embodiment, the step of maintaining the fuel cell temperature of the fuel cell system 110 at the target fuel cell temperature $T_2$ by controlling the control variable selected from a group consisting of the pump rotational speed $n_{pump}$, the opening degree $\alpha$, the fan on-off state $u_{fan}$, and any combination thereof can be performed by the feedforward control and feedback control as described in the first control mode, which will not be repeated herein again for the sake of simplicity.

When the pump rotational speed $n_{pump}$ and/or the opening degree $\alpha$ is selected as the control variable, in the step of maintaining the fuel cell temperature at the target fuel cell temperature $T_2$, the total flow rate $Q_1$ of the cooling liquid in the major circulating system may be changed. In this case, the opening degree $\alpha_1$ of the sixth valve 420 and the opening degree $\alpha_2$ of the second valve 150 can be regulated to have the cooling liquid in the major circulating system flown through the heat exchanger 410 always at the volume flow rate $Q_{h,fc}$.

In an embodiment, the step of maintaining the cabin temperature of the cabin at the target cabin temperature $T_{cabin}$ by controlling a power of the third heater 330 can also be performed by a feedforward control and a feedback control. More specifically, the step of maintaining the cabin temperature of the cabin at the target cabin temperature $T_{cabin}$ by controlling a power of the third heater 330 can include the steps of:

performing a feedforward control of the cabin temperature by controlling the power of the third heater 330;

obtaining a current cabin temperature, and performing a feedback control of the cabin temperature according to a difference between the current cabin temperature and the target cabin temperature, to acquire a compensation amount for the power of the third heater 330; and making a compensation for the power of the third heater 330 according to the compensation amount for the power of the third heater 330, thereby controlling the cabin temperature to reach the target cabin temperature.

A principle of the feedforward control and feedback control in this embodiment is the same as that of the feedforward control and feedback control performed according to the difference between the current fuel cell temperature $T_{fc}$ and the target fuel cell temperature $T_2$ in the first control mode. The feedback control is performed according to the difference between the current cabin temperature and the target cabin temperature to acquire the compensation amount for the power. The electric power to be output by the third heater 330 can be acquired by calculating a sum of the compensation amount of the power and the feedforward power of the third heater 330. Therefore, the feedforward control and the feedback control can be utilized to maintain the temperature in the cabin while decreasing the energy consumption of the entire vehicle and increasing the traveling range of the vehicle.

In an embodiment, the feedback control of the cabin temperature is performed via the PID control algorithm, the Robust predictive control algorithm, or the $H_\infty$ algorithm.

When the fuel cell vehicle is in a low temperature environment, the excess heat generated by the fuel cell system is utilized to keep the cabin warm, which ensures the required temperature and decreases the energy consumption of the entire vehicle. Thus, the temperature of the fuel cell system is controlled stably and accurately, the energy consumption of the entire vehicle is decreased, and the economical practicability is increased.

Therefore, the multi-environment integrative thermal management method for the fuel cell vehicle can adopt different control modes at different environment temperatures. In the normal temperature environment mode, i.e., in the first control mode, the stability and the accuracy of the temperature control can be ensured via the feedforward control and the feedback control. In the first control mode, if in high temperature environment, the working current of the fuel cell is decreased under the synergic control of the power system to increase the efficiency of the fuel cell to decrease the quantity of the heat generated by the fuel cell, solving the problem of the high difficulty of the heat dissipation of the cooling system in the high temperature environment. In the second control mode, in the low temperature environment mode, the excess heat of the fuel cell system 110 is fully utilized to ensure the temperature of the fuel cell system 110 and the temperature in the cabin, thereby decreasing the energy consumption of the entire vehicle. Therefore, in the complicated and changeable environment throughout the year, the multi-environment integrative thermal management method for the fuel cell vehicle provided in the present disclosure can ensure the accuracy and the stability of the control for the temperature of the fuel cell system, decrease the energy consumption of the entire vehicle, improve the economical efficiency of the entire vehicle, and increase the driving mileage.

The technical features of the above-described embodiments may be arbitrarily combined. In order to make the description simple, not all possible combinations of the technical features in the above embodiments are described. However, as long as there is no contradiction in the combination of these technical features, the combinations should be in the scope of the present disclosure.

What described above are only several implementations of the present disclosure, and these embodiments are specific and detailed, but not intended to limit the scope of the present disclosure. It should be understood by a person of ordinary skill in the art that various modifications and improvements can be made without departing from the conception of the present disclosure, and all fall within the protection scope of the present disclosure. Therefore, the patent protection scope of the present disclosure is defined by the appended claims In the present disclosure, the relational terms such as "first" and "second" are used to differentiate an entity or operation from another entity or operation, and do not require or imply any actual relationship or sequence between these entities or operations. Moreover, the terms "include", "comprise" and any variation thereof are intended to cover a non-exclusive inclusion. Therefore, a process, method, object, or device, which includes a series of elements, not only includes such elements, but also includes other elements not specified expressly, or may further include inherent elements of the process, method, object, or device. If no more limitations are made, an element limited by "include a/an . . . " does not exclude other same elements existing in the process, the method, the article, or the device which includes other elements.

The various embodiments of the present disclosure are described progressively, where each embodiment is described by emphasizing its differences form some other embodiments. For portions of the various embodiments that are similar to each other, references can be made to each other.

The descriptions of the provided embodiments enable those skilled in the art to implement or use this disclosure. Various modifications to these embodiments will be apparent to those skilled in the art. The general principles defined herein can be implemented in other embodiments without departing from the spirit or scope of the present disclosure. Therefore, the present disclosure will not be limited to the embodiments illustrated in this disclosure, but should conform to the widest scope consistent with the principles and novel features provided herein.

What is claimed is:

1. A multi-environment integrative thermal management method for a fuel cell vehicle, applied to a fuel cell thermal management sub-system of the fuel cell vehicle,
    wherein the fuel cell thermal management sub-system comprises a fuel cell system, a first pump, a first valve, a first heater, a second valve, a first radiator, and a first tank, the fuel cell system has a cooling liquid inlet and a cooling liquid outlet,
    the cooling liquid inlet is in communication with an output end of the first heater, an input end of the first heater is in communication with a first end of the first valve, a second end of the first valve is in communication with an output end of the first pump, an input end of the first pump is in communication with the cooling liquid outlet,
    the cooling liquid inlet is further in communication with an output end of the first radiator, an input end of the first radiator is in communication with a first end of the second valve, a second end of the second valve is in communication with a third end of the first valve,
    the first heater, the first valve, the first pump, and the fuel cell system form a minor circulating system, and
    the first radiator, the second valve, the first valve, the first pump, and the fuel cell system form a major circulating system;
    wherein the method comprises:
    detecting a current environment temperature T; and
    proceeding steps of a first control mode if the current environment temperature T is equal to or larger than an environment temperature threshold $T_1$; and
    proceeding steps of a second control mode if the current environment temperature T is lower than the environment temperature threshold $T_1$;
    wherein the steps of the first control mode comprises:
    acquiring a control variable selected from a pump rotational speed $n_{pump}$ of the first pump, an opening degree $\alpha$ of the first valve, a fan on-off state $u_{fan}$ of the first radiator, and any combination thereof;
    performing a feedforward control of a fuel cell temperature of the fuel cell system by controlling the control variable;
    obtaining a current fuel cell temperature $T_{fc}$ of the fuel cell system, and performing a feedback control of the fuel cell temperature according to a difference between the current fuel cell temperature $T_{fc}$ and a target fuel cell temperature $T_2$, to acquire a compensation amount; and
    making a compensation for the control variable in the feedforward control according to the compensation amount, thereby controlling the fuel cell temperature of the fuel cell system to reach the target fuel cell temperature $T_2$.

2. The method of claim 1, wherein the performing the feedforward control of the fuel cell temperature comprises:
    regulating a temperature $T_{w,m}$ of the cooling liquid at the cooling liquid inlet of the fuel cell system to reach the target fuel cell temperature $T_2$ by controlling the control variable according to following equations (1) to (6):

$$T_{w,m} = [\alpha W_w \cdot T_{w,s} + (1-\alpha) W_w \cdot T_{w,rad,out}]/W_w \quad (1)$$

$$\dot{T}_{w,s} = C_w \cdot \alpha W_w \cdot (T_{w,out} - T_{w,s})/C_1 + P_a/C_1 \quad (2)$$

$$\dot{T}_{w,rad,out} = W_w \cdot [T_{w,rad,in}(t-h_{rad}) - \Delta T - T_{w,rad,out}]/m_{rad} \quad (3)$$

$$\Delta T = \int_{t-h_{rad}}^{t} [u_{fan} \cdot k_{rad} \cdot (T_{w,rad,in} - T_{atm})/((1-\alpha) W_w \cdot C_w)] d\tau \quad (4)$$

$$W_w = Q_V \cdot \rho \quad (5)$$

$$Q_V = D \cdot n_{pump} \quad (6)$$

wherein $T_{w,s}$ denotes a temperature of the cooling liquid at an output end of the first heater, $T_{w,rad,out}$ denotes a temperature of the cooling liquid at the output end of the first radiator, $W_w$ denotes a mass flow rate of the cooling liquid flowing through the first pump and input to the first valve;

$C_w$ denotes a specific heat capacity of the cooling liquid of the fuel cell system, $T_{w,out}$ denotes a temperature of the cooling liquid at the cooling liquid outlet of the fuel cell system, $C_1$ denotes a total of heat capacities of the first pump and the first heater, $P_a$ denotes a heating power of the first heater;

$T_{w,rad,in}$ denotes a temperature of the cooling liquid at the input end of the first radiator, $\Delta T$ denotes a temperature decrease caused by the fan of the first radiator, $m_{rad}$ denotes a mass of the cooling liquid in the first radiator, $k_{rad}$ denotes a coefficient of the heat dissipation of the first radiator, $T_{atm}$ denotes an environment temperature, $h_{rad}$ denotes the time period required to allow the cooling liquid to flow through the first radiator;

$Q_v$ denotes a volume flow rate of the cooling liquid input to the first valve from the first pump, $\rho$ denotes a density of the cooling liquid, and D denotes a displacement of the first pump.

3. The method of claim 2, wherein the compensation amount acquired by the feedback control is a compensation amount for the temperature $T_{w,m}$, and the performing the feedback control of the fuel cell temperature comprises:

performing the feedback control to acquire the compensation amount for the temperature $T_{w,m}$ according to the difference between the current fuel cell temperature $T_{fc}$ and the target fuel cell temperature $T_2$; and calculating a compensation amount for the control variable on the basis of the compensation amount for the temperature $T_{w,m}$.

4. The method of claim 1, wherein the compensation amount acquired by the feedback control is the compensation amount of the control variable, and the performing the feedback control of the fuel cell temperature comprises:

performing the feedback control according to the difference between the current fuel cell temperature $T_{fc}$ and the target fuel cell temperature $T_2$ to calculate the compensation amount for the control variable.

5. The method of claim 1, wherein a control algorithm of the feedback control is the PID control algorithm, the robust predictive control algorithm, or the $H_\infty$ algorithm.

6. The method of claim 4, wherein the making the compensation for the control variable in the feedforward control according to the compensation amount is to add the compensation amount for the control variable to the current value of the control variable.

7. The method of claim 1, wherein the steps in the first control mode further comprise:

in the starting stage of the vehicle, controlling the opening degree $\alpha$ of the first valve to be 1 when the current fuel cell temperature $T_{fc}$ is lower than the target fuel cell temperature $T_2$; and controlling the opening degree $\alpha$ of the first valve to be smaller than 1 when the current fuel cell temperature $T_{fc}$ is higher than or equal to the target fuel cell temperature $T_2$.

8. The method of claim 1, wherein when the current fuel cell temperature $T_{fc}$ is higher than or equal to the target fuel cell temperature $T_2$, the steps in the first control mode can further comprise:

decreasing an operating electric current and increasing an operating voltage of the fuel cell system.

9. The method of claim 1, wherein the fuel cell vehicle further comprises a power battery thermal management sub-system, a cabin air heating sub-system, and a heat exchanging sub-system, the power battery thermal management sub-system comprises a power battery, a second pump, a fourth valve, a second radiator, a second heater, a third valve, a fifth valve, and a second tank;

the cabin air heating sub-system comprises a cabin air warmer, a windscreen defroster, a third heater, a third pump, and a radiator module, the heat exchanging sub-system includes a heat exchanger and a sixth valve, a first end of the sixth valve is in fluid communication with the third end of the first valve, a second end of the sixth valve is in fluid communication with a first inlet of the heat exchanger, a first outlet of the heat exchanger is in fluid communication with the input end of the first radiator, a second inlet of the heat exchanger is in fluid communication with an input end of the second heater, a cooling liquid outlet of the power battery is in fluid communication with an input end of the second heater, an output end of the second heater is in fluid communication with a first end of the third valve, a second end of the third valve is in fluid communication with an input end of the second pump, an output end of the second pump is in fluid communication with a cooling liquid inlet of the power battery, an input end of the second radiator is in fluid communication with the cooling liquid outlet of the power battery, an output end of the second radiator is in fluid communication with a first end of the fourth valve, a second end of the fourth valve is in fluid communication with the input end of the second pump, the second end of the third valve is in fluid communication with a first end of the fifth valve, a second outlet of the heat exchanger is in fluid communication with an input end of the third pump, an output end of the third pump is in fluid communication with an input end of the third heater, an output end of the third heater is in fluid communication with an input end of the windscreen defroster, an output end of the windscreen defroster is in fluid communication with an input end of the cabin air warmer, an output end of the cabin air warmer is in fluid communication with an input end of the radiator module, and an output end of the radiator module is in fluid communication with a second end of the fifth valve;

wherein the steps of the second control mode comprise:

in the starting stage of the vehicle, controlling the opening degree $\alpha$ of the first valve to be 1, and controlling the first heater, the second heater, and the third heater to heat the cooling liquid when the quantity of heat generated by the fuel cell system is smaller than or equal to a quantity of heat dissipated to the environment from the fuel cell system when the vehicle is in the starting stage;

controlling the opening degree $\alpha$ of the first valve to be smaller than 1 when the quantity of heat generated by the fuel cell system is larger than the quantity of heat dissipated to the environment from the fuel cell system, and the temperature of the cooling liquid in the minor circulating system is equal to or higher than the target fuel cell temperature $T_2$; and opening the six valve when the temperature of the cooling liquid in the major circulating system is equal to or higher than the target fuel cell temperature $T_2$.

10. The method of claim 9, wherein when the temperature of the cooling liquid in the major circulating system is equal to or higher than the target fuel cell temperature $T_2$, the steps of the second control mode further comprise:

acquiring a quantity $Q_{T,tgt}$ of heat required to be supplied into the cabin to keep the cabin at a target cabin temperature $T_{cabin}$ according to equation (12):

$$Q_{T,tgt} = c_p \rho_g V_{cabin} \frac{dT_{cabin}}{dt} \qquad (12)$$

wherein $c_p$ denotes a specific heat capacity of the air in the cabin, $\rho_g$ denotes a density of the air in the cabin, and $V_{cabin}$ denotes a volume of the cabin;

acquiring a volume flow rate $Q_{h,fc}$ of the cooling liquid in the major circulating system of the fuel cell thermal management sub-system flowing through the heat exchanger when all of the quantity $Q_{T,tgt}$ of heat is supplied by the heat exchanger, according to equation (13):

$$Q_{T,tgt} = \rho c_w Q_{h,fc} \cdot (T_{w,out} - T_{h,fc,out}) \tag{13}$$

wherein $\rho$ denotes a density of the cooling liquid, $C_w$ denotes a specific heat capacity of the cooling liquid, $T_{w,out}$ denotes a temperature of the cooling liquid at the cooling liquid outlet, $T_{h,fc,out}$ denotes a temperature of the cooling liquid at the second outlet of the heat exchanger;

regulating an opening degree $\alpha_1$ of the sixth valve and an opening degree $\alpha_2$ of the second valve to allow the cooling liquid of the major circulating system of the fuel cell thermal management sub-system to flow through the heat exchanger 410 at the volume flow rate $Q_{h,fc}$, according to equation (14):

$$Q_{h,fc} = \frac{Q_1}{1 + f(\alpha_1, \alpha_2)} \tag{14}$$

wherein $f(\alpha_1, \alpha_2)$ denotes a function of $\alpha_1$ and $\alpha_2$, and $Q_1$ denotes a total volume flow rate of the cooling liquid in the major circulating system of the fuel cell thermal management sub-system;

maintaining the fuel cell temperature of the fuel cell system at the target fuel cell temperature $T_2$ by controlling the control variable selected from a group consisting of the pump rotational speed $n_{pump}$, the opening degree $\alpha$, the fan on-off state $u_{fan}$, and any combination thereof; and maintaining a cabin temperature of the cabin at the target cabin temperature $T_{cabin}$ by controlling a power of the third heater.

11. The method of claim 10, wherein in the second control mode, the maintaining the fuel cell temperature of the fuel cell system at the target fuel cell temperature $T_2$ by controlling the control variable comprises:

performing a feedforward control of the fuel cell temperature by controlling the control variable;

obtaining a current fuel cell temperature $T_{fc}$ of the fuel cell system, and performing a feedback control of the fuel cell temperature according to a difference between the current fuel cell temperature $T_{fc}$ and a target fuel cell temperature $T_2$, to acquire a compensation amount; and making a compensation for the control variable in the feedforward control according to the compensation amount, thereby controlling the fuel cell temperature of the fuel cell system to reach the target fuel cell temperature $T_2$.

12. The method of claim 11, wherein in the second control mode, the performing the feedforward control of the fuel cell temperature comprises:

regulating a temperature $T_{w,m}$ of the cooling liquid at the cooling liquid inlet of the fuel cell system to reach the target fuel cell temperature $T_2$ by controlling the control variable according to following equations (1) to (6):

$$T_{w,m} = [\alpha W_w \cdot T_{w,s} + (1-\alpha) W_w \cdot T_{w,rad,out}] / W_w \tag{1}$$

$$\dot{T}_{w,s} = C_w \cdot \alpha W_w \cdot (T_{w,out} - T_{w,s}) / C_1 + P_a / C_1 \tag{2}$$

$$\dot{T}_{w,rad,out} = W_w \cdot [T_{w,rad,in}(t - h_{rad}) - \Delta T - T_{w,rad,out}] / m_{rad} \tag{3}$$

$$\Delta T = \int_{t-h_{rad}}^{t} [u_{fan} \cdot k_{rad} \cdot (T_{w,rad,in} - T_{atm}) / ((1-\alpha) W_w \cdot C_w)] d\tau \tag{4}$$

$$W_w = Q_v \cdot \rho \tag{5}$$

$$Q_V = D \cdot n_{pump} \tag{6}$$

wherein $T_{w,s}$ denotes a temperature of the cooling liquid at an output end of the first heater, $T_{w,rad,out}$ denotes a temperature of the cooling liquid at the output end of the first radiator, $W_w$ denotes a mass flow rate of the cooling liquid flowing through the first pump and input to the first valve;

$C_w$ denotes a specific heat capacity of the cooling liquid of the fuel cell system, $T_{w,out}$ denotes a temperature of the cooling liquid at the cooling liquid outlet of the fuel cell system, $C_1$ denotes a total of heat capacities of the first pump and the first heater, $P_a$ denotes a heating power of the first heater;

$T_{w,rad,in}$ denotes a temperature of the cooling liquid at the input end of the first radiator, $\Delta T$ denotes a temperature decrease caused by the fan of the first radiator, $m_{rad}$ denotes a mass of the cooling liquid in the first radiator, $k_{rad}$ denotes a coefficient of the heat dissipation of the first radiator, $T_{atm}$ denotes an environment temperature, $h_{rad}$ denotes the time period required to allow the cooling liquid to flow through the first radiator;

$Q_v$ denotes a volume flow rate of the cooling liquid input to the first valve from the first pump, $\rho$ denotes a density of the cooling liquid, and D denotes a displacement of the first pump.

13. The method of claim 11, wherein in the second control mode, the compensation amount acquired by the feedback control is a compensation amount for the temperature $T_{w,m}$, and the performing the feedback control of the fuel cell temperature in the second control mode comprises:

performing the feedback control to acquire the compensation amount for the temperature $T_{w,m}$ according to the difference between the current fuel cell temperature $T_{fc}$ and the target fuel cell temperature $T_2$; and calculating a compensation amount for the control variable on the basis of the compensation amount for the temperature $T_{w,m}$.

14. The method of claim 11, wherein in the second control mode, the compensation amount acquired by the feedback control is the compensation amount of the control variable, and the performing the feedback control of the fuel cell temperature comprises:

performing the feedback control according to the difference between the current fuel cell temperature $T_{fc}$ and the target fuel cell temperature $T_2$ to calculate the compensation amount for the control variable.

15. The method of claim 11, wherein in the second control mode, a control algorithm of the feedback control is the PID control algorithm, the robust predictive control algorithm, or the $H_\infty$ algorithm.

16. The method of claim 14, wherein in the second control mode, the making the compensation for the control variable in the feedforward control according to the compensation amount is to add the compensation amount to the current value of the control variable.

17. The method of claim 10, wherein the maintaining the cabin temperature of the cabin at the target cabin temperature by controlling the power of the third heater comprises:

performing a feedforward control of the cabin temperature by controlling the power of the third heater;

obtaining a current cabin temperature, and performing a feedback control of the cabin temperature according to a difference between the current cabin temperature and the target cabin temperature, to acquire a compensation amount for the power of the third heater; and making a compensation for the power of the third heater according to the compensation amount for the power of the third heater, thereby keeping the cabin temperature at the target cabin temperature.

\* \* \* \* \*